United States Patent

[11] 3,604,056

| [72] | Inventor | Ronald L. Larsen<br>Minneapolis, Minn. |
|---|---|---|
| [21] | Appl. No. | 829,354 |
| [22] | Filed | June 2, 1969 |
| [45] | Patented | Sept. 14, 1971 |
| [73] | Assignee | Conwed Corporation |

[54] APPARATUS FOR PREVENTION OF SHAFT SEAL DEGRADATION
7 Claims, 1 Drawing Fig.

[52] U.S. Cl. .................................................. 18/12 N,
18/12 P, 92/186, 277/16
[51] Int. Cl. .................................................. B29f 3/01,
F16j 15/16
[50] Field of Search .................................................. 18/12 N, 12
P, 16 R; 277/15, 16, 22; 92/186

[56] References Cited
UNITED STATES PATENTS

| 1,825,163 | 9/1931 | Schweter | 92/186 X |
| 2,498,670 | 2/1950 | Gaenzle | 18/12 P |
| 2,880,709 | 4/1959 | Sakraida et al. | 92/186 X |
| 3,354,501 | 11/1967 | Bachman et al. | 18/12 P |

Primary Examiner—J. Spencer Overholser
Assistant Examiner—R. L. Spicer, Jr.
Attorney—Eyre, Mann & Lucas ABSTRACT: A method and apparatus is provided for circulating a cooling medium through a cored shaft to preserve the life of the seals for the shaft in an extruder of the type used in the production of plastic structures wherein a hot melt is extruded through cooperating die members which are moved relative to one another by means of one or more shafts that tend to heat up and destroy the seals.

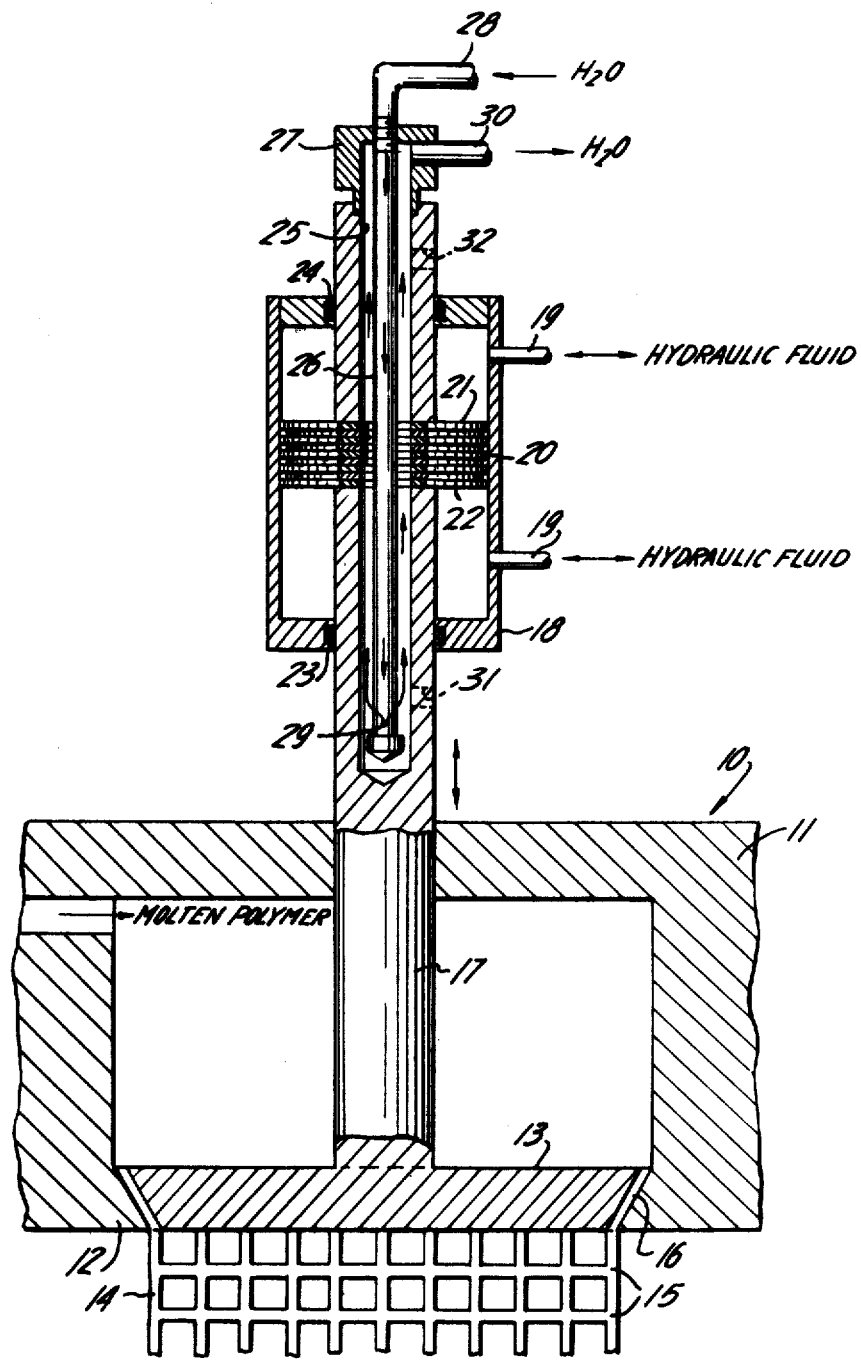

APPARATUS FOR PREVENTION OF SHAFT SEAL DEGRADATION

The present invention relates to a method and apparatus for preventing the degradation of extruder shaft seals that tends to occur when the seals are subjected to high temperatures. More particularly, the present invention preserves the life of seals for the shafts which control die movement in an extrusion process for producing plastic structures and especially plastic netting.

In such extrusion processes, a hot plastic melt is extruded through a pair of cooperating die members at least one of which is mounted on a shaft which either reciprocates or rotates, generally at exceptionally high speeds, to move the die member and produce the desired plastic structure. Large quantities of heat are transferred from the hot plastic melt during extrusion to the shaft and by conduction to the seals between the shaft and the head of the extrusion apparatus. The seals are generally made of rubber or Teflon or some similar polymer such as viton which tends or degrade and fail due to the high speed and high temperature of the shaft.

This tendency for the seals to degrade and fail has now been overcome and in accordance with the present invention, the movable shaft is cored in the area of the seals and a cooling medium is circulated through the core to reduce the temperature of the shaft. As a result, the seals can apparently withstand the extraordinarily high speed and temperature of the shaft as evidenced by a lack of degradation and a relatively long life. A particularly desirable way to circulate the cooling medium is to place a hollow bubbler shaft which has at least one opening in its lower end portion into the core of the extruder shaft so that the cooling fluid can flow down into the core of the extruder shaft. In this way, heat will be transferred from he shaft to the cooling fluid as it bubbles up in the core of the extruder shaft and a maximum heat transfer is achieved by feeding the cooling medium into the bottom of the core which is at the hottest portion of the extruder shaft.

The type of apparatus to which this invention relates is more fully described in two U.S. Pat. Nos. 3,020,840 and 3,384,692 issued to Galt and Mercer respectively and in a copending application, Ser. No. 875,476 filed Nov. 10, 1969.

Referring now to the drawing which depicts a preferred embodiment of the present invention and in which like numerals refer to like parts, 10 represents a partial schematic drawing of an extrusion apparatus. The apparatus has a head 11 into which molten polymer is flowed under high temperature and pressure for subsequent extrusion through the stationary die plate 12 and the movable die member 13. A particular type of extruded plastic net is illustrated in the drawing which is comprised of a plurality of spaced longitudinal strands 14 and a plurality of spaced transverse strands 15. The longitudinal strands 14 are extruded through a plurality of channels 16 cut into the face of die plate 12 when the movable member 13 is in its closed position as shown in the drawing. The transverse strands 15 are extruded when member 13 is moved up into the open position (not shown) to expose a continuous annular opening between die plate 12 and member 13.

Member 13 is mounted on a shaft 17 which extends up through the extruder head 11 and through hydraulic cylinder 18. Hydraulic cylinder 18 is provided with a plurality of openings 19 for controlling the hydraulic fluid which acts on the double-faced piston 20 fixedly mounted on shaft 17. The shaft reciprocates at exceptionally high speed of the order of up to 100 cycles per second in response to a differential in pressure conventionally generated between the two piston faces 21 and 22. Leakage of hydraulic fluid from the cylinder is prevented by the bottom viton seal 23 and top viton seal 24. The seals 23 and 24 may be of any conventional sealing material but viton is preferred.

Heat is transferred from the molten polymer to die member 13 and shaft 17 whereby the shaft becomes very hot and this heat along with the speed of the shaft adversely affects the life of the seals 23 and 24. During extrusion, shaft temperatures near the seals 23 may reach temperatures as high as 400° F.

To prevent seal degradation, a core 25 which extends through the area of the seals is cut into shaft 17. A hollow bubbler shaft 26 of smaller diameter than core is positioned coaxially in the core 25 and adjustably retained in place therein by a screw cap 27 which may be turned to adjust the position of the bubbler shaft for the most efficient cooling.

Bubbler shaft 26 has an opening 28 at the top into which cooling fluid such as water is fed and a plurality of openings 29 at the bottom where the water flows out into core 25. If desired, the plurality of openings 29 may be replaced by a single large opening. The hottest portion of the core is at the bottom and it is therefore desirable to feed the cooling fluid into the core at the bottom for the most efficient heat transfer. The cooling fluid flows up through the core and out opening 30 in screw 27. If desired, the fluid can be cooled and recirculated.

In another embodiment, the bubbler shaft is eliminated and the cooling fluid is fed directly into and out of the core 25 as by means of the openings 31 and 32 shown in dotted lines in shaft 17.

In the particular embodiment shown, the bubbler shaft has an inside diameter of 0.275 inch and inlet opening 28 is one thirty-second inch in diameter. Water at room temperature was fed into the bubbler shaft and the temperature of the shaft 17 just below seal 23 was about 203° F. as contrasted to a temperature of about 347° F. prior to cooling.

It will be understood that it is intended to cover all changes and modifications of the preferred embodiments of the invention, herein chosen for the purpose of illustration which do not constitute departures from the spirit and scope of the invention.

What we claim is:

1. In an extrusion apparatus wherein a hot melt is extruded through a plurality of die members at least one of which is mounted on a movable shaft which is provided with at least one seal the improvement comprising cooling means including a hollow core positioned completely within the shaft in the area of the seal, and means for flowing cooling fluid into and out of said core to cool the shaft and prolong the life of the seal.

2. An extrusion apparatus as specified in claim 1 wherein said shaft passes through a hydraulic cylinder and the seal is positioned between said shaft and hydraulic cylinder.

3. An extrusion apparatus as specified in claim 1 wherein said core is positioned in the end of said shaft opposite to that end on which the die member is mounted.

4. An extrusion apparatus as specified in claim 1 wherein said means for flowing cooling fluid into and out of said core includes inlet and outlet bores in said shaft in fluid communication with said core.

5. An extrusion apparatus as specified in claim 1 which includes a hollow bubbler shaft having a smaller outside diameter than the inside diameter of the core positioned in said core and in which said means for flowing fluid into said core comprises an inlet opening in said bubbler shaft spaced above said seal and at least one outlet opening in said bubbler shaft spaced below said seal whereby cooling fluid is fed through the bubbler shaft into said core, said core having an outlet opening therein to allow the fluid to exit from said core.

6. An extrusion apparatus as specified in claim 5 wherein said outlet opening in said core is positioned above said seal.

7. An extrusion apparatus as specified in claim 5 wherein said outlet openings in said bubbler shaft are positioned near the bottom of said core.